April 30, 1957   C. D. ACKERMAN ET AL   2,790,753
QUALITY OF SLURRY OIL RECYCLE IN FLUID CATALYTIC CRACKING
Filed Dec. 29, 1954
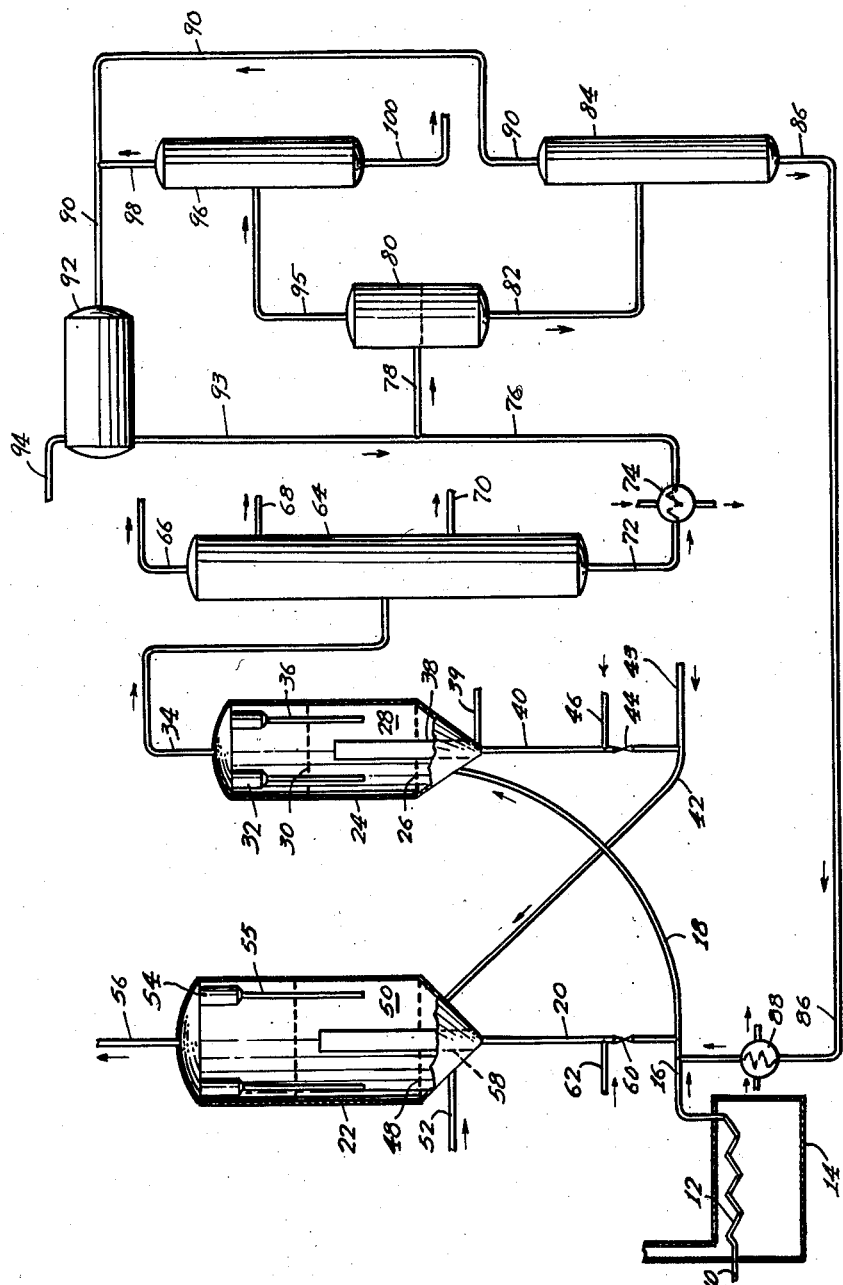
INVENTORS
Carl D. Ackerman and
Robert E. Donaldson.
BY
ATTORNEY

United States Patent Office

2,790,753
Patented Apr. 30, 1957

2,790,753

QUALITY OF SLURRY OIL RECYCLE IN FLUID CATALYTIC CRACKING

Carl D. Ackerman, Indiana Township, Allegheny County, and Robert E. Donaldson, Penn Township, Allegheny County, Pa., assignors to Gulf Research & Development Company, Pittsburgh, Pa., a corporation of Delaware Application December 29, 1954, Serial No. 478,438

12 Claims. (Cl. 196—52)

This invention relates to a process for the conversion of hydrocarbon oils and more particularly to an improvement in the fluid catalytic cracking of petroleum hydrocarbons.

In processes for fluid catalytic cracking of petroleum hydrocarbons, a fluid bed of a dense phase of finely divided cracking catalyst particles is maintained in a reactor at an elevated temperature in the range of about 800° to 1000° F. The hydrocarbon charge stock is introduced into the lower end of the reactor and passes upwardly together with conversion products through the fluid bed to suspend the catalyst particles in a hindered settling condition. Above the well defined upper surface of the fluid bed is a dilute phase of catalyst particles entrained in the gaseous reaction products discharged from the upper surface of the fluid bed.

The gaseous reaction products and entrained catalyst in the dilute phase pass through separators which separate a portion of the catalyst particles and return them to the fluid bed. The reaction products and remaining entrained catalyst particles discharged from the separator and reactor are delivered to fractionation equipment in which the reaction products are separated into fractions of different boiling points. In the usual fractionation equipment, reaction products are divided into a gasoline fraction, a light gas oil fraction, a heavy recycle oil fraction and a bottoms fraction. The catalyst entrained with the reaction products discharged from the reactor collects in the bottoms fraction.

Sufficiently large amounts of the catalyst are entrained with the reaction products discharged from the reactor to make it desirable to return the entrained catalyst to the reactor. In a commercial fluid catalytic cracking unit, the catalyst entrained with the reaction products in a day may amount to as much as 5 to 7 percent of the catalyst inventory of the cracking unit.

It has been the practice in the past to deliver the bottoms fraction to settling equipment in which as much as two-thirds, or even more, of the bottoms is decanted to leave a thick, pumpable slurry of catalyst in fractionator bottoms. The slurry is ordinarily diluted with a lighter recycle oil or fresh feed and recycled to the reactor.

Heavy catalytically cracked oils such as the fractionator bottoms are undesirable stocks for charging to catalytic cracking processes. They contain substantial amounts of heavy aromatic compounds which cause excessive formation of coke on cracking catalysts, thereby increasing the carbon burn-off required for regeneration of the catalyst. It is because of the undesirable nature of the fractionator bottoms as charge stocks that a large portion of the fractionator bottoms is decanted from the catalyst prior to its return to the reactor. The decanted oil is usually used in the preparation of heavy fuel oils of low value; hence, paraffinic constituents of the fractionator bottoms which may be suitable as charge stocks are degraded to products of low value.

In this invention, the bottoms from the fractionating system containing catalyst entrained from the reactor of a fluid cracking unit are extracted with a selective solvent having a lower specific gravity than the bottoms and a preferential solubility for aromatic hydrocarbons. The raffinate from the extraction has improved characteristics as a charge stock to the cracking reactor and is recycled to the reactor with the entrained catalyst which remains with the raffinate in the extraction.

The single figure of the drawing is a diagrammatic flow sheet of apparatus for the fluid catalytic cracking of hydrocarbons in which the bottoms from the fractionation system are extracted and a slurry of catalyst and the resulting raffinate recycled to the reactor of the cracking unit.

Referring to the drawing, the fresh feed to be cracked is passed from a supply line 10 to the heating coils 12 in a furnace 14 in which the feed is heated generally to a temperature in the range of 500° to 800° F. to maintain heat balance of the cracking process. The fresh feed may be any hydrocarbon fraction suitable for charging to catalytic cracking processes for conversion to lower boiling fractions such as gasoline and light gas oil. The hot fresh feed is discharged from the heating coils 12 into a line 16 which delivers the fresh feed to a transfer line 18. The fresh feed picks up hot regenerated catalyst discharged from a standpipe 20 of a regenerator 22 and transports the catalyst through transfer line 18 into the bottom of a reactor 24. The heat of the regenerated catalyst raises the temperature of the feed to the temperature desired for the catalytic cracking reaction.

The hydrocarbon feed, which is largely in the vapor phase at the temperature of the cracking reaction, and catalyst pass upwardly through a grid 26 in the lower end of the reactor 24 into and through a fluid bed 28 of catalyst particles maintained in the reactor 24. Liquid components of the fresh feed are either substantially immediately cracked to form gaseous reaction products or are adsorbed on the surface of the catalyst until cracked, leaving the catalyst in a substantially dry, fluid condition. Above the upper surface 30 of the fluid bed of catalyst in the reactor 24 is a dilute phase of catalyst particles carried by gaseous reaction products. The gaseous reaction products and a portion of the catalyst particles pass through separators 32 in the upper end of reactor 24 and are discharged from the reactor through a line 34. Catalyst particles separated from the reaction products in the separator 32 are returned to the fluid bed 28 through dip legs 36.

Any of the well known cracking catalysts such as natural or synthetic composites of silica and alumina or silica and magnesia can be employed. The catalysts may be promoted with small amounts of the oxides of other metals such as zirconia, beryllia, thoria, boria, and the like. Preferred cracking catalysts are composites of silica and alumina comprising a major proportion of silica and a minor proportion of alumina. The catalyst is finely divided, substantially all of the weight of the catalyst being in particles between 20 and 100 microns in diameter.

Catalyst particles contaminated with carbonaceous deposits are continuously withdrawn from the fluid bed 28 through a stripper 38, into the bottom of which a stripping gas is introduced through line 39, and standpipe 40 and are delivered into a transfer line 42. An oxygen-containing transfer gas, normally air or flue gas, delivered to transfer line 42 from supply line 43 picks up the catalyst particles discharged from the standpipe 40 and delivers them into the lower end of regenerator 22. The rate of withdrawal of catalyst through the stripper 38 and standpipe 40 is controlled by means of a slide valve 44. Aeration gas in introduced into the standpipe 40 immediately above the slide valve 44 through line 46 to maintain the catalyst in the standpipe 40 in a fluid, free-flowing condition.

The contaminated catalyst and oxygen-containing gases pass upwardly through a grid 48 in the lower end of the regenerator 22 into a fluid bed 50 of catalyst maintained in the regenerator by upwardly flowing oxygen-containing gases. The temperature in the regenerator ranges from about 1000° to 1200° F. Carbonaceous deposits on the catalyst are burned from the surface of the catalyst in the fluid bed 50 to regenerate the catalyst to a condition suitable for further use in the cracking process. If necessary, additional oxygen-containing gas for the regeneration can be introduced into the regenerator 22 through a line 52.

Catalyst particles leaving the fluid bed 50 with flue gas pass through separators 54 which separate catalyst particles from the flue gas and return them through dip legs 55 to the fluid bed 50. The flue gases are discharged from the regenerator 22 through a line 56 to a stack, not shown. In some instances the flue gases are passed through Cottrell precipitators for the removal of catalyst fines before delivery to the stack. Regenerated catalyst is continuously withdrawn from the fluid bed 50 through a well 58 and delivered into the upper end of standpipe 20. The rate of withdrawal of the regenerated catalyst through the well 58 and standpipe 20 is controlled by the slide valve 60. Aeration gas for maintaining the catalyst in a fluid condition is introduced into standpipe 20 through a line 62 directly above the slide valve 60.

Reaction products together with entrained catalyst particles, are delivered through line 34 to a fractionation system, indicated generally by a fractionating tower 64. In the fractionating tower 64 shown in the drawing, gas and gasoline are removed as an overhead product through a line 66 and light gas oil and heavy cycle oil fractions are withdrawn from the tower as side products through lines 68 and 70, respectively. The catalyst entrained from the reactor 24 with the reaction products accumulates in the bottom of tower 64 and is removed with the bottom fraction through a line 72. Throughout the description of this invention the term "entrained catalyst" is used to designate catalyst discharged from the reactor with the reaction products.

In this invention, the bottoms fraction from tower 64 is extracted with a solvent having a specific gravity lower than the specific gravity of the fractionator bottoms and which will selectively extract aromatic fractions from the bottoms. In order to improve the efficiency of the extraction, the slurry of bottoms and catalyst withdrawn through line 72 is cooled in a heat exchanger 74, preferably to the lowest temperature which will permit the bottoms fraction to be handled without difficulty. The bottoms fraction should not be cooled to temperatures below the pour point of the bottoms fraction, or to temperatures so low that the increased viscosity interferes with the extraction and subsequent separation. The cooled slurry is delivered through a line 76 from the heat exchanger 74 to a line 78 in which it is mixed with the selective solvent. The flow existing in line 78 is sufficiently turbulent to insure thorough contact between the bottoms fraction and the solvent. If desired, other mixing apparatus, for example, tanks provided with agitators, or baffled mixers, can be provided. The mixture of solvent and bottoms fraction, together with the entrained catalyst is delivered from line 78 into a separator 80.

Any selective solvent having a preferential solubility for aromatic compounds, a specific gravity lower than the specific gravity of the bottoms fraction, and which will form two separate phases when mixed with the bottoms fraction is suitable for use in this invention. An example of a suitable solvent is acetonitrile. Similarly, solvents having a specific gravity higher than the bottoms fraction and a preferential solubility for paraffinic compounds, whereby the entrained catalyst and paraffinic constituents remain together, can be used. Mixtures of solvents can also be employed in order to provide an optimum combination of preferential solubility for aromatic compounds and specific gravity lower than that of the bottoms fraction. An example of such a mixture of solvents is a mixture of acetonitrile with furfural in proportions to provide a solvent mixture of the proper specific gravity, or a mixture of acetonitrile and dimethyl formamide.

Liquid ammonia modified by the addition of other compounds to adjust the solubility of the hydrocarbons therein can also be used. For example, up to about 15 percent, by weight, of water can be added to the ammonia to decrease the solubility of the hydrocarbons in the ammonia. The addition of about 0 to 75 percent methyl amine, and preferably up to about 50 percent methyl amine, will increase the solubility of the hydrocarbons in the ammonia.

In the apparatus shown in the drawings, a single contact between the solvent and bottoms fraction followed by separation of the two phases has been shown. In some instances, it may be desired to improve the separation of the aromatic constitutents from the paraffinic constituents in the bottoms fraction by providing more than one contact of the solvent and the bottoms fraction. For example, a countercurrent extraction tower in which the solvent is introduced near the bottom of the tower and the bottoms fraction near the top can be employed to improve the separation. The separation obtained is also dependent upon the solvent to oil ratio which is determined in part by the solvent employed. Solvent to oil ratios ranging from 0.3 to 10, or even higher, are suitable.

The raffinate together with the entrained catalyst is withdrawn from the bottom of the separator 80 through line 82 and passed through a stripper 84 in which any dissolved solvent is stripped from the raffinate. The solvent-free raffinate and catalyst is withdrawn from the bottom of stripper 84 through a line 86 and recycled to the transfer line 18. A heat exchanger 88 is provided to raise the temperature of the recycled raffinate to a level suitable for its introduction into the transfer line 18. Solvent removed from the raffinate in stripper 84 is discharged through line 90 and delivered to a surge tank 92, in which the solvent is collected for further extraction of additional fractionator bottoms. Solvent is delivered from surge tank 92 through line 93 to line 78 for mixture with the additional fractionator bottoms. A supply line 94 discharges into surge tank 92 for the addition of make-up solvent to the system.

The extraction of the bottoms fraction with a solvent selective for aromatic hydrocarbons and having a specific gravity lower than the bottoms fraction causes the raffinate to collect in the bottom of the separator together with the entrained catalyst. The improvement in the quality of the raffinate as a charge stock to a catalytic cracking process eliminates the necessity of any separation of the entrained catalyst from the raffinate in which it is suspended prior to returning the entrained catalyst to the reactor. In this process the single extraction step separates both the entrained catalyst and the raffinate from the high boiling point aromatic compounds of the fractionator bottoms.

The extract phase from the separator 80 which contains substantial quantities of aromatic compounds is withdrawn from the top of the separator 80 through a line 95 and delivered to a stripper 96. Solvent is stripped from the extract in the stripper 96 and delivered through line 98 and line 90 to the surge tank 92. The extract phase of the bottoms fraction of tower 64 is withdrawn from the stripper 96 through line 100.

In a specific embodiment of this invention, a Kuwait gas oil having a gravity of 22.2° API and a distillation range, corrected to 760 millimeters of mercury, absolute, ranging from an overpoint of 399° F. to a 90 percent point of 982° F. was cracked in a fluid catalytic cracking unit at a temperature of 930° F. The space velocity, on a weight basis, was maintained at 2.9 pounds of gas oil/hr./lb. of catalyst to give a conversion of the gas oil of 52 percent. The conversion is equal to 100 minus the yield of gas oil and fractionator bottoms. The reaction products were fractionated to give a heavy catalytic gas oil bottoms fraction of approximately 7.5 percent of the fresh feed to the reactor. The bottoms fraction contained about 0.8 lb. of catalyst per gallon of the fraction.

The bottoms fraction was extracted with acetonitrile in a solvent to oil ratio of 3. The raffinate from the extraction, stripped of solvent, amounted to about 67 percent of the bottom. The entrained catalyst remains with the raffinate and is recycled, together with added fresh feed to give a diluted slurry oil containing 0.5 pound of catalyst/gallon, to the reactor.

An index of the quality of a petroleum hydrocarbon fraction as a charge stock to cracking processes is the characterization factor of the fraction. (See Industrial & Engineering Chemistry, volume 27, page 1460; 1935.) In general, the higher the characterization factor of a hydrocarbon fraction within a given boiling point range, the better the quality of that fraction as a charge stock to a cracking process. Typical characterization factors vary from about 12 to 12½ for Pennsylvania stocks down to 10 to 11 for recycle stocks and cracked residuums. In this invention, aromatic compounds of high boiling points are extracted from the fractionator bottoms to leave a raffinate of higher characterization factor and entrained catalyst for recycling to the cracking reactor.

The following examples illustrate the improvement of bottoms fractions from the catalytic cracking of hydrocarbons by the use of selective solvents of preferential solubility for aromatic compounds and lower specific gravity than the bottoms fractions.

EXAMPLE I

A heavy catalytic gas oil obtained as a bottoms fraction in the fractionation of reaction products from fluid catalytic cracking of the 22.2° API gas oil in the specific embodiment was extracted with acetonitrile (specific gravity of 0.783) at a temperature of 120° to 130° F. and a solvent ratio, by volume, of 0.5 in a single contact extraction procedure. The heavy catalytic gas oil before extraction had a characterization factor of 11.10 and a gravity of 17.4° API. Yields of 92.5 percent raffinate and 7.5 percent extract, on a solvent-free basis, were obtained from the extraction. The raffinate had a characterization factor of 11.20 and a gravity of 18.5° API.

EXAMPLE II

A sample of the heavy catalytic gas oil of Example I was extracted with acetonitrile at a temperature of 120° to 130° F. and a solvent to oil ratio, by volume, of 1.0 in a single contact extraction. Yields of 86.1 percent raffinate and 13.9 percent extract, on a solvent-free basis, were obtained. The resulting raffinate had a characterization factor of 11.32 and a gravity of 20.2° API.

EXAMPLE III

A sample of the heavy catalytic gas oil of Example I was extracted with acetonitrile at a temperature of 120° to 130° F. and a solvent to oil ratio of 3.0. Yields of 67.2 percent raffinate and 32.8 percent extract were obtained. The raffinate had a characterization factor of 11.65 and a gravity of 24.7° API.

The results of the extraction of heavy catalytic gas oil with acetonitrile for Examples I, II, and III are presented in Table I.

*Table I*

SOLVENT EXTRACTION OF HEAVY CATALYTIC GAS OIL

| Example No | 1 | 2 | 3 |
|---|---|---|---|
| Heavy Gas Oil: | | | |
| Characterization Factor | 11.10 | 11.10 | 11.10 |
| Gravity, °API | 17.4 | 17.4 | 17.4 |
| Specific Gravity | .953 | .953 | .953 |
| Extraction: | | | |
| Solvent | | Acetonitrile | |
| Specific Gravity | .783 | .783 | .783 |
| Temperature | 120-130 | 120-130 | 120-130 |
| Solvent to Oil Ratio | 0.5 | 1.0 | 3.0 |
| Yields, Wt. Percent (Solvent-free basis): | | | |
| Raffinate | 92.5 | 86.1 | 67.2 |
| Extract | 7.5 | 13.9 | 32.8 |
| Raffinate: | | | |
| Characterization Factor | 11.20 | 11.32 | 11.65 |
| Gravity, °API | 18.5 | 20.2 | 24.7 |

Other solvents or combinations of solvents can be employed which are more selective than acetonitrile. For example, furfural produces a marked improvement in the characterization factor of heavy catalytic gas oils even when used in solvent to oil ratios below 0.5; however, furfural has a specific gravity higher than the specific gravity of most recycle oils. Hence, furfural cannot be used alone in the process of this invention since the catalysts entrained with the reaction products discharged from the reactor will remain in the heavy extract phase containing the aromatic compounds which are preferentially removed from the recycle oil. Mixtures of furfural with solvents of lower specific gravity can be employed in this invention and are particularly valuable in the extraction of heavy catalytic gas oils of higher specific gravity as shown in the following examples.

EXAMPLE IV

Reaction products from the catalytic cracking of 22.2° API Kuwait gas oil were distilled to produce a heavy catalytic gas oil as a bottoms fraction having a gravity of 2.9° API (specific gravity 1.053) and a characterization factor of 10.43. The bottoms fraction was extracted with furfural (specific gravity 1.16) at a temperature of 120° to 130° F. and a solvent to oil ratio of 0.41. The characterization factor of the raffinate was 11.55. Yields of 28.6 percent raffinate and 71.4 percent extract were obtained.

EXAMPLE V

A sample of the heavy catalytic gas oil employed in Example IV was extracted with acetonitrile (specific gravity 0.783) at a temperature of 120° to 130° F. and a solvent to oil ratio, by volume, of 3.0. The characterization factor of the gas oil was increased from 10.43 to 10.61. Yields of 82.9 percent raffinate and 17.1 percent extract were obtained.

EXAMPLE VI

A sample of heavy catalytic gas oil similar to that in Example IV having a gravity of 1.3° API (specific gravity 1.065) was extracted with a mixture of acetonitrile and furfural in proportions of about 84 percent of acetonitrile and 16 percent furfural. The mixture had a specific gravity of 0.827. The extraction was performed at 120° to 130° F. with a solvent to oil ratio, by volume, of 3.8. The characterization factor of the raffinate was 10.65 as compared with 10.3 for the heavy catalytic gas oil. Yields of 67.4 percent raffinate and 32.6 percent extract were obtained.

The process of this invention substantially reduces the amount of aromatic or coke-precursing compounds that are present in the oil recycled to the cracking reactor with the entrained catalyst. Although the amount of high-boiling point aromatic compounds recycled to the reactor is reduced, the total amount of the fractionator bottoms recycled to the reactor is increased as compared with processes of the prior art in which a large part of the fractionator bottoms is decanted from the entrained catalyst and used as low value fuel oil. An important advantage of this invention over processes heretofore available in which the fractionator bottoms were extracted with a solvent, and the raffinate recycled to the reactor, is that the entrained catalyst remains with the raffinate. Hence, the catalyst is washed free of the aromatic compounds and retained in the raffinate through subsequent processing for recycling to the reactor.

We claim:

1. A process for the fluid catalytic cracking of petroleum hydrocarbons comprising passing a petroleum hydrocarbon charge stock through a fluid bed of a cracking catalyst in a reactor at cracking conditions, discharging reaction products and entrained catalyst from the reactor, condensing a heavy high boiling fraction of reaction products and collecting entrained catalyst therein, extracting aromatic fractions from the heavy high boiling fraction with a solvent having a specific gravity lower than the specific gravity of the heavy high boiling fraction and a preferential solubility for aromatic hydrocarbons, separating a raffinate and entrained catalyst from the extract, and recycling the raffinate and entrained catalyst to the reactor.

2. A process for the fluid catalytic cracking of petroleum hydrocarbons, comprising passing a petroleum hydrocarbon charge stock at cracking conditions through a fluid bed of cracking catalyst in a reactor, discharging reaction products and entrained catalyst from the reactor, fractionating the reaction products, withdrawing a bottoms fraction of heavy high boiling hydrocarbons and catalyst entrained from the fractionator, extracting the bottoms fraction and entrained catalyst with a selective solvent having a preferential solubility for aromatic hydrocarbons and a specific gravity lower than the specific gravity of the bottoms fraction to form an extract rich in aromatic compounds, and a raffinate rich in paraffinic compounds, said entrained catalyst remaining with the raffinate, and recycling the raffinate and entrained catalyst to the reactor.

3. In a process for the fluid catalytic cracking of petroleum hydrocarbons in which a petroleum hydrocarbon charge stock is passed through a fluid bed of cracking catalyst in a reactor at cracking conditions, reaction products, unconverted charge stock, and entrained catalyst are discharged from the reactor and passed to a fractionation system, a heavy high boiling bottoms fraction and entrained catalyst are withdrawn together from the fractionation system, and entrained catalyst and at least a portion of the bottoms fraction are recycled to the reactor, the improvement comprising extracting the bottoms fraction and entrained catalyst with a selective solvent having a preferential solubility for aromatic compounds and a specific gravity lower than the specific gravity of the bottoms fraction to form an extract rich in aromatic compounds and a raffinate rich in paraffinic compounds, collecting the entrained catalyst with the raffinate, stripping solvent from the raffinate and catalyst, and recycling entrained catalyst and raffinate to the reactor.

4. A process as set forth in claim 3 in which the selective solvent is acetonitrile.

5. A process as set forth in claim 3 characterized by the extraction of the bottoms with a mixture of solvents.

6. A process as set forth in claim 3 characterized by the extraction of the bottoms with a mixture of acetonitrile and furfural.

7. A process as set forth in claim 3 which is characterized by the extraction of the bottoms with a mixture of acetonitrile and dimethyl formamide.

8. A process for the fluid catalytic cracking of petroleum hydrocarbons comprising passing a gas oil through a fluid bed of cracking catalyst in a reactor maintained at cracking conditions, discharging reaction products, unconverted gas oil and entrained catalyst from the reactor, fractionating the mixture discharged from the reactor, withdrawing a bottoms fraction of entrained catalyst and heavy catalytic gas oil from the fractionation, cooling the bottoms fraction, extracting the cooled bottoms fraction with a selective solvent having a preferential solubility for aromatic hydrocarbons and a specific gravity lower than the specific gravity of the bottoms fraction to form an extract phase and a raffinate phase having a higher density than the extract phase whereby the entrained catalyst remains with the raffinate phase, heating the raffinate and entrained catalyst and returning them to the reactor.

9. A process for the fluid catalytic cracking of petroleum hydrocarbons comprising passing a gas oil through a fluid bed of cracking catalyst in a reactor maintained at cracking conditions, discharging reaction products, unconverted gas oil and entrained catalyst from the reactor, fractionating the mixture discharged from the reactor, withdrawing a bottoms fraction of entrained catalyst and heavy catalytic gas oil from the fractionation, cooling the bottoms fraction, extracting the cooled bottoms fraction with a selective solvent having a preferential solubility for aromatic hydrocarbons and a specific gravity lower than the specific gravity of the bottoms fraction to form an extract phase and a raffinate phase having a higher density than the extract phase whereby the entrained catalyst remains with the raffinate phase, diluting the raffinate phase and entrained catalyst with fresh feed to form a diluted slurry oil, and returning the diluted slurry oil to the reactor.

10. In a process for the catalytic cracking of petroleum hydrocarbons in which petroleum hydrocarbons are passed upwardly through a fluidized bed of a cracking catalyst in a reactor, reaction products and entrained catalyst are discharged from the reactor, the entrained catalyst is collected in a bottoms fraction of reaction products, and entrained catalyst is recycled to the reactor, the improvement comprising extracting the bottoms fraction with a solvent to form a first phase rich in aromatic hydrocarbons and a second phase rich in paraffinic hydrocarbons and containing the entrained catalyst, and recycling the entrained catalyst and paraffin-rich phase to the reactor.

11. A process for the fluid catalytic cracking of petroleum hydrocarbons comprising passing a hydrocarbon charge stock through a fluid bed of cracking catalysts in a reactor maintained at cracking conditions, discharging a mixture of reaction products and entrained catalyst from the reactor, fractionating the mixture discharged from the reactor to separate a bottoms fraction containing the catalyst entrained from the reactor, extracting the bottoms fraction with a selective solvent to form an extract phase rich in aromatic hydrocarbons and a raffinate phase rich in non-aromatic hydrocarbons, the specific gravity of the solvent being lower than the specific gravity of the raffinate phase whereby the raffinate phase is separated as a bottoms product containing the entrained catalyst, stripping solvent from the raffinate phase and entrained catalyst, and returning the raffinate phase and entrained catalyst to the reactor.

12. A process as set forth in claim 11 in which the solvent is acetonitrile and the ratio of the weight of solvent to the weight of the bottoms fraction in the extraction is in the range of about 0.3:1 to 10:1.

References Cited in the file of this patent

UNITED STATES PATENTS

| | | |
|---|---|---|
| 2,342,888 | Nysewander et al. | Feb. 29, 1944 |
| 2,361,080 | Bolt et al. | Oct. 24, 1944 |
| 2,382,724 | Kollenberg | Aug. 14, 1945 |
| 2,384,967 | Schumacher et al. | Sept. 18, 1945 |
| 2,441,827 | McKinnis | May 18, 1948 |
| 2,467,920 | Voge et al. | Apr. 19, 1949 |
| 2,616,836 | Schmidt et al. | Nov. 4, 1952 |